Sept. 15, 1970 C. O. REISER 3,528,764
METHOD AND APPARATUS FOR RETARDING EVAPORATION
FROM WATER SURFACES
Filed Nov. 28, 1967 3 Sheets-Sheet 1

INVENTOR.
CASTLE O. REISER
BY
Thomas F. Mason
ATTORNEY

Sept. 15, 1970  C. O. REISER  3,528,764
METHOD AND APPARATUS FOR RETARDING EVAPORATION
FROM WATER SURFACES
Filed Nov. 28, 1967

INVENTOR.
CASTLE O. REISER
BY
ATTORNEY

Sept. 15, 1970 C. O. REISER 3,528,764
METHOD AND APPARATUS FOR RETARDING EVAPORATION
FROM WATER SURFACES
Filed Nov. 28, 1967 3 Sheets-Sheet 3
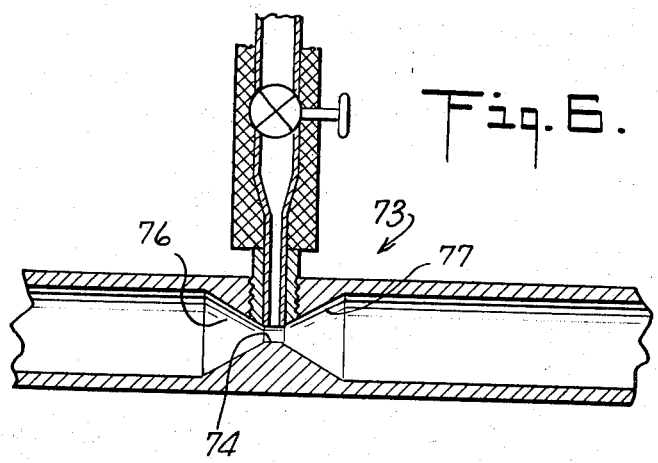
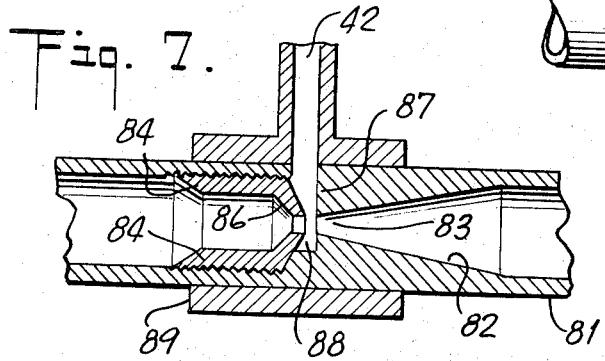
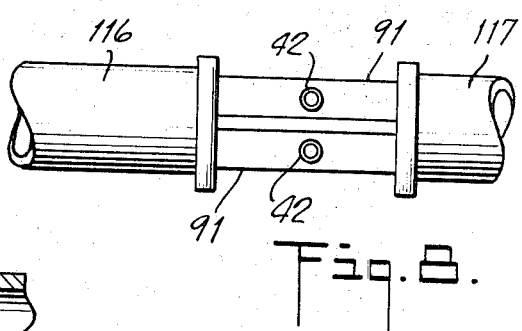
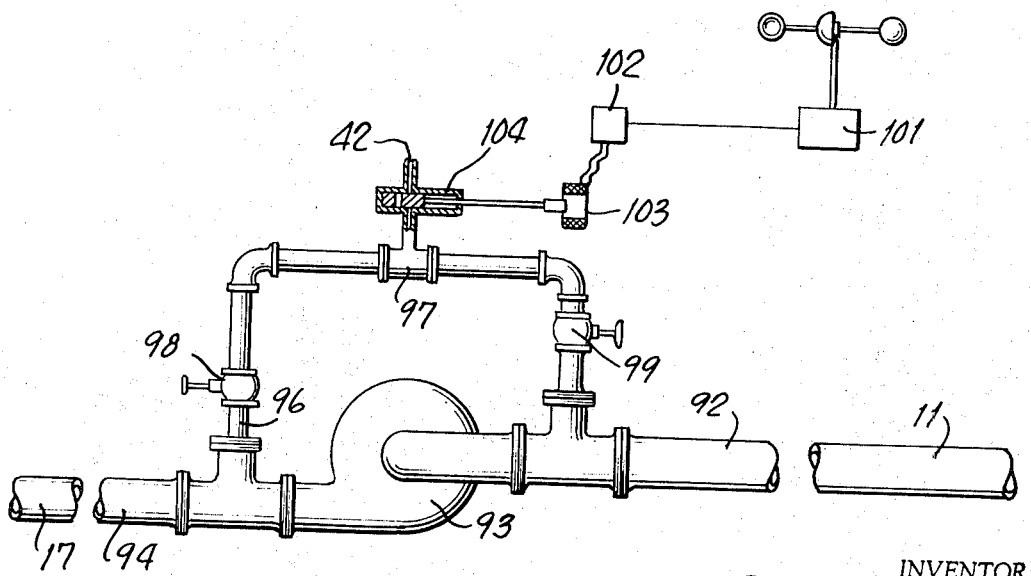
INVENTOR.
CASTLE O. REISER
BY
Thomas F. Lucas
ATTORNEY United States Patent Office 3,528,764
Patented Sept. 15, 1970

3,528,764
METHOD AND APPARATUS FOR RETARDING EVAPORATION FROM WATER SURFACES
Castle O. Reiser, Tempe, Ariz., assignor to Research Corporation, New York, N.Y., a non-profit corporation of New York
Filed Nov. 28, 1967, Ser. No. 686,057
Int. Cl. B01j 1/18
U.S. Cl. 21—60.5                                6 Claims

ABSTRACT OF THE DISCLOSURE

A method of applying a substantially monomolecular film of oleaginous material, such as a straight chain fatty alcohol, onto the surface of a body of water so as to reduce water evaporation losses by forming an emulsion of the oleaginous material in water and then applying the resulting formed emulsion to the water surface. The emulsion containing the oleaginous material dispersed in water is formed by aspirating liquid oleaginous material into a moving stream of water to disperse the oleaginous material therein. The resulting formed emulsion at a suitable concentration of the oleaginous material therein, generally below about 0.15% by weight, is then distrbuted and sprayed from along about the shoreline onto the surface of the water to form a monomolecular surface film thereon.

---

Figure 1:
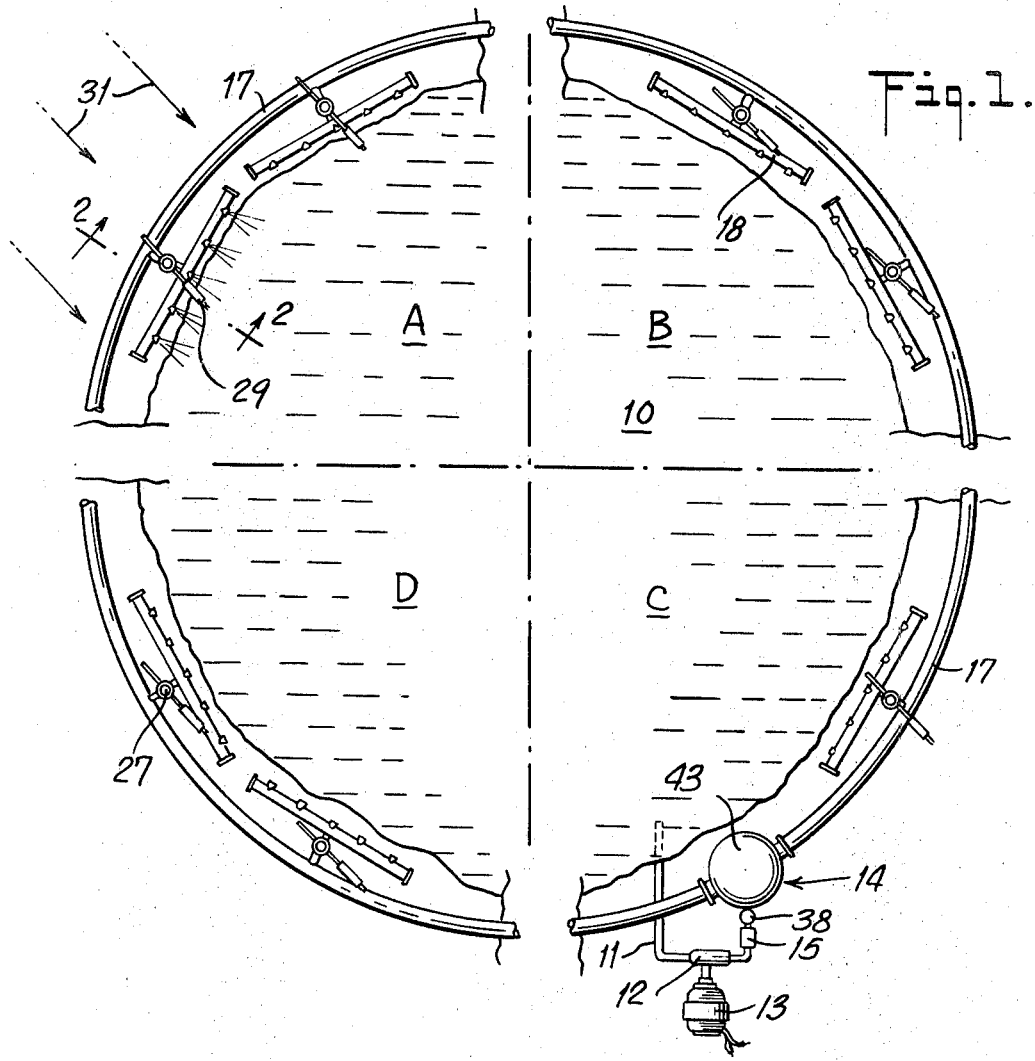
Figure 2:
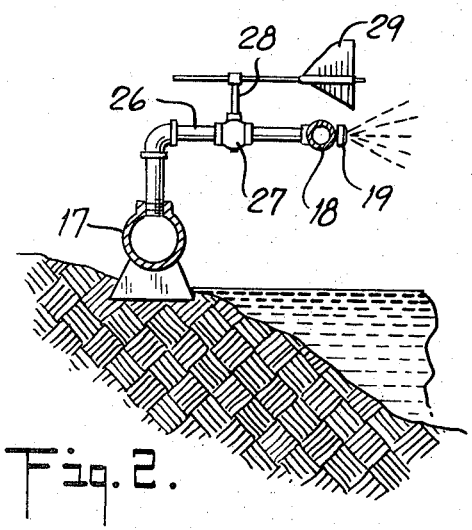
Figure 3:
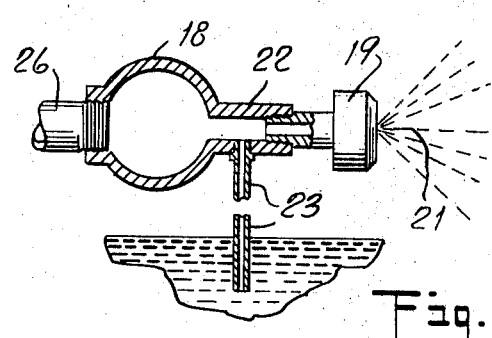

This invention relates to an improved method for reducing water evaporation from lakes and streams and more in particular, to improvements in the application of thin oleaginous films to open water for retarding evaporation.

The idea of applying an oil, fat, or oil-like material to water to retard the evaporation thereof is old. There are reports of experiments conducted by Benjamin Franklin in the application of oleaginous films to water for this purpose, and Dr. Irving Langmuir produced monomolecular films of oil in water in the eary 1920's and is responsible for the concept that relatively large chain monovalent alcohols are particularly effective to retard water evaporation because they become vertically oriented and can be made to produce a very successful monomolecular layer on the face of the water, see also U.S. Pats. 2,563,002, 2,878,098, 2,903,330, 3,184,789 and 3,199,944, the dicslosures of which are herein incoporated and made part of this disclosure.

Early experiments in this field utilized relatively stable paraffins and the like substances and attempted to provide means for retaining the oleaginous material in place for a relatively long period of time. For long retention of the film, the chemical activity of the oleaginous material had to be of a low order. The film would be required to be relatively thick, and the use of substances which would be biologically degradable would have been impossible. It is now quite well accepted that the best approach to the application of thin films of oleaginous material to open water to retard evaporation is to substantially continuously apply a very thin film, perferably and suitably monomolecular in thickness, to make up for the loss of the film due to the wind carrying it to the shore and to continuously replace the film lost by other means, such as by chemical action, biological degradation, and the like.

Notwithstanding established economic requirements, there is still little use of oleaginous films to prevent water evaporation from the surface of open water bodies. It has been suggested that the oleaginous material used, such as a fatty alcohol, be dissolved in a solvent and spread out over the surface of the water so that the solvent will substantially completely evaporate and leave only a very thin film of the fatty alcohol. This procedure has not been successful because of the contamination which may be introduced by the solvent and the fact that the solvent is completely lost and the operation then becomes very expensive. The use of as much as a gallon of solvent for as little as a pound of oleaginous material is not uncommon. The requirement will vary, of course, with the particular oleaginous material and solvent selected, and also with other conditions, such as temperature.

A very excellent dispersion of a fatty alcohol in water may be produced at an elevated temperature with a surface active agent and employing conventional high speed mixing equipment such as a Hobart mixer, a colloid mill, a homogenizer, a sonic disperser or the like. This method has many disadvantages, the principal one being that a batch system of mixing an application is usually necessary, or, if an oil in water type of emulsion is to be introduced into a large tank for continuous application, it is customary that about 20% of the mixture be oleaginous, and that the emulsion be very stable to avoid stratification.

In an attempt to overcome disadvantages of the type identified, it has been suggested that a fatty alcohol mixture of between 12–24 carbon atoms, but preferably between 16–18 carbon atoms, be produced in the form of a fine powder, and that the resulting powder comprise about 20% of the emulsifier with water, and the resulting emulsion pumped or dripped onto the surface of the water. While this suggested process offers some advantages, it appears to be completely uneconomical for several reasons. To obtain a suitable powder it is usually necessary that the fatty alcohol be relatively pure such as for example comprising principally stearic alcohol. Only a pure product is sufficiently crystalline to produce a powder successfully and to purify a fatty alcohol is expensive and the production of the powder is also expensive. Generally speaking, a powdered fatty alcohol may cost twice as much as a solid cake of fatty alcohol even when the alcohol has been reduced to powed for, by means of mixing equipment, emulsification is still required and unless an interface modifying agent is used, the mix will very seldom be sufficiently stable for conventional use, and stratification will occur. The powder moreover tends to have a relatively large number of particles up to a few hundredths of an inch in diameter, and when mixed cold and introduced cold to a water surface, will frequently remain in the form of clumps.

The principal object of my present invention is the provision of an inexpensive method for applying oleaginous materials such as fatty alcohols in very finely divided form to the surface of a body of water to form thereon a very thin film of oleaginous material approaching a uniform thickness of one molecular layer.

Another object is to produce a very thin layer of oleaginous material on an open body of water continuously and very inexpensively.

A further object is to utilize desirable developments of the prior art in a method for retarding water evaporation, while at such time avoiding the significant limitations and objections of prior art methods.

In accordance with the general features of my invention, I continuously move a stream of water at relatively high speed through a relatively narrow opening or several openings, while at the same time delivering to such openings through a relatively small orifice liquefied oleaginous material, the liquid oleaginous material being introduced under lower pressure and at much lower speed than the speed of the water so that very small fragments of the oleaginous material are sheared off for dispersal in the water stream. A certain amount of turbulence may also be effected immediately after introduction of the oleaginous media so that the very fine droplets of oleaginous materials are further split up into smaller fragments before stabilization of a larger size particle can occur. Preferably the oleaginous material is a fatty alcohol having from 14 to 22 carbon atoms, and the fatty alcohol is liquefied, preferably by heating, although some solvent material may also be introduced if desired to contribute to the liquidity of the fatty alcohol.

The amount of oleaginous material dispersed in the water is preferably maintained at a considerably lower volume than is necessary when a batch emulsion is formed, although my invention is not limited to any specific proportion of oleaginous material in water. A surfactant or water-oleaginous material interface modifying agent may be used but is not essential. The water stream having taken on its burden of oleaginous material, the water being in the continuous phase, is moved continuously to the point of application onto a body of water where it is sprayed onto the surface. Very thin films are thus produced very economically. The invention contemplates either the combination of a single emulsifying unit and a single spray or battery of sprays, although best results are obtained when the line of sprays continues over a relatively long distance, even entirely around a relatively small body of water and individual sprays activated in response to wind direction so that the sprays actually delivering the emulsion to the surface will always be on the windward side.

Further objects and features of my invention will be apparent from the following detailed description taken with the accompanying drawings, where FIG. 1 is a plan view with parts broken away, the view being in part schematic, and showing the manner in which my invention is employed to maintain a protective film over the entire surface of an entire body of water;

FIG. 2 is an enlarged fragmentary elevational view taken on the line 2—2 of FIG. 1 and showing the emulsion line, a distribution line, a plurality of spray heads and a wind operated control for the valve delivering emulsion to the spray heads;

FIG. 3 is a further enlarged sectional view showing the spray head in action;

FIG. 4 is a fragmentary vertical sectional view partially schematic showing one form of equipment in accordance with the present invention for producing the emulsion;

FIG. 5 is a wiring diagram showing the manner in which power is automatically delivered to the solenoid operated valve controlling the flow of liquid oleaginous material;

FIGS. 6, 7 and 8 show modifications; and

FIG. 9 is a modification of FIG. 4, showing one manner of preparing or diluting the emulsion before delivering to the supply line 17.

Referring now first to FIGS. 1 through 4 showing apparatus with which the method of the present invention may be practiced, it may be assumed that a film of relatively high molecular weight, normally water insoluble fatty material, such as a fatty alcohol, is to be applied to the surface of lake 10 (FIG. 1). Water is continuously drawn from such lake through a pipe 11 by means of a pump 12 driven by an electric motor 13. This water is then delivered to emulsifying apparatus indicated generally by the reference character 14 through a delivery pipe 16. The emulsion formed by the apparatus 14 is then delivered along the shore of said lake through an emulsion line 17. For simplification, and to illustrate the invention, this line is shown as extending entirely around the lake. In the case of a relatively large body of water, such as a body of water impounded behind a large dam, a plurality of emulsifying units 14 would probably be used and the emulsion line from each unit would feed into line 17 to provide the emulsion required by the nearby sprays thereby reducing the time required for the emulsion to flow from an emulsifying unit to the sprays.

At various locations along the path of the emulsion line 17, I provide a plurality of distribution pipes 18 each with a plurality of spray heads 19. The spray heads are provided with suitable orifices and nozzles 21 to form a spray through which the emulsion is delivered. To provide for additional water dilution at the spray, a pipe 22 to which the nozzle 21 is attached may aspirate additional water from the lake or other body of water through a water tube 23 with its hollow open end extending under the surface of the water. The distribution pipes 18 are supported immediately adjacent the shoreline so that the spray heads deliver their spray on top of the water as close to the shoreline as possible. Support for both the emulsion line and distribution pipes may be on the land but suitably both may be submerged in the water and the spray heads either projected above the water or carried on suitable floats as determined by the particular local conditions found and the economics of installation and maintenance.

The emulsion is delivered from the emulsion line 17 to the distribution pipes 18 through a short connecting pipe 26 and the flow controlled by valve 27. The valve stem 28 carries a wind vane 29 and the valve 27 is so constructed that when the wind blows windward of the valve's location, emulsion will be introduced to the distribution pipe 18 and to the spray heads 19. The vane 29 may be thought of as having an arrow at its forward or long end and when this end is pointing out over the water, the valve associated with the vane will be opened to admit emulsion to the spray heads. Looking at FIG. 1, the lake 10 indicated as approximately round for convenience may be considered as having four quadrants, A, B, C and D, with the wind from the direction indicated by the arrow 31 the spray heads in the quadrant A would be delivering finely divided emulsion to the top of the water immediately adjacent to the shore. With a change in wind direction and a resulting movement of the film on the surface of the water in a different direction, spray would automatically take place at the spray heads to the windward of the new wind direction. A quadrant of the lake is taken only for illustration since optimal treatment might require spraying on a different fraction of the shoreline.

The emulsifying unit 14 indicated generally in FIG. 1 is shown partly schematically in FIG. 4. Inserted between the water line 16 coming from the pump 12 and the emulsion line 17 is a section 32 having its inner walls shaped to provide a restricted passageway 33. The section 32 is in the nature of the Venturi tube but is specially adapted for use with the present invention as further explanation will make clear. The walls upstream of the restrictive passageway 33 together define at angle 34 and also so do the walls downstream from the restricted passageway define an angle 36. While these walls are referred to as comprising an angle which would imply that they are straight sided, they will normally, at least in part, have some curvature so that reference to an angle should not be taken as a limitation in the particular contour of the walls forwardly or rearwardly of the restrictive passageway 33. In advance of the section 32, I provide a tubular connection 37 to a reservoir 38 which is adapted to contain a supply of surfactant or interface modifying agent, if desired. Flow from the reservoir 38 is controlled by a valve 39. Many of a very large number of inerface modifying agents may be employed, suitably any of the alkyl sulfates, a derivative of a polyhydric alcohol in which one hydroxy group is esterified with fatty acid and another with a hydrophilic group such as sulfuric acid and various other substances of the same general type, straight chain, branch chain, aliphatic or aromatic, substances having amino and amido groups and the like. Preferably, the interface modifying agent used is polar, and, of course, it should be non-toxic and preferably biologically degradable. Relatively high molecular weight alkyl sulfates neutralized with an inorganic or organic base are suitable for the purpose and usually yield very good results. The interface modifying agent may be introduced as such but preferably is delivered in the form of a solution or dispersion in water because even when an interface modifying agent is used, the interface modifying agent normally will not have to be more than a fraction of a percent of the entire emulsion. The interface modifying agent may be dissolved in the oleaginous material as well.

A plastic insert 41 may be provided to act as a thermal insulator between the relatively cold insert 32 through which the water is flowing and the warmer tube 42 which extends from a receptacle 43 to and through the plastic insert 41. Heating blanket 44 extends around the upper receptacle 43 and around the tube 42 to maintain oleaginous material 46 in liquid or flowable condition. A valve 47 may be employed for shutting off the flow of the liquid oleaginous material, but during normal operation, flow is controlled by a sliding valve 48 operated by a solenoid type relay 49 and controlled by an anemometer 51 in a manner which will be described. The sliding valve 48 is disposed in a transverse housing 52 which may be open on its ends but normally closed against admission of air or the like by means of the sliding valve 48. A top aperture 53 aligned with the feed aperture 54 in the valve 48 permits outside air to pass through the valve and into the bottom part of the tube 42 as the valve is moved to the left looking at FIG. 4 to shut off flow from the receptacle 43.

A bleeder tube 56 communicates with the inside of the tube 42 through a valve 57. By opening the valve 57, a small amount of air may be entrained with the molten oleaginous material to produce a three phase system having certain advantages which will be referred to hereinbelow.

Figure 4:
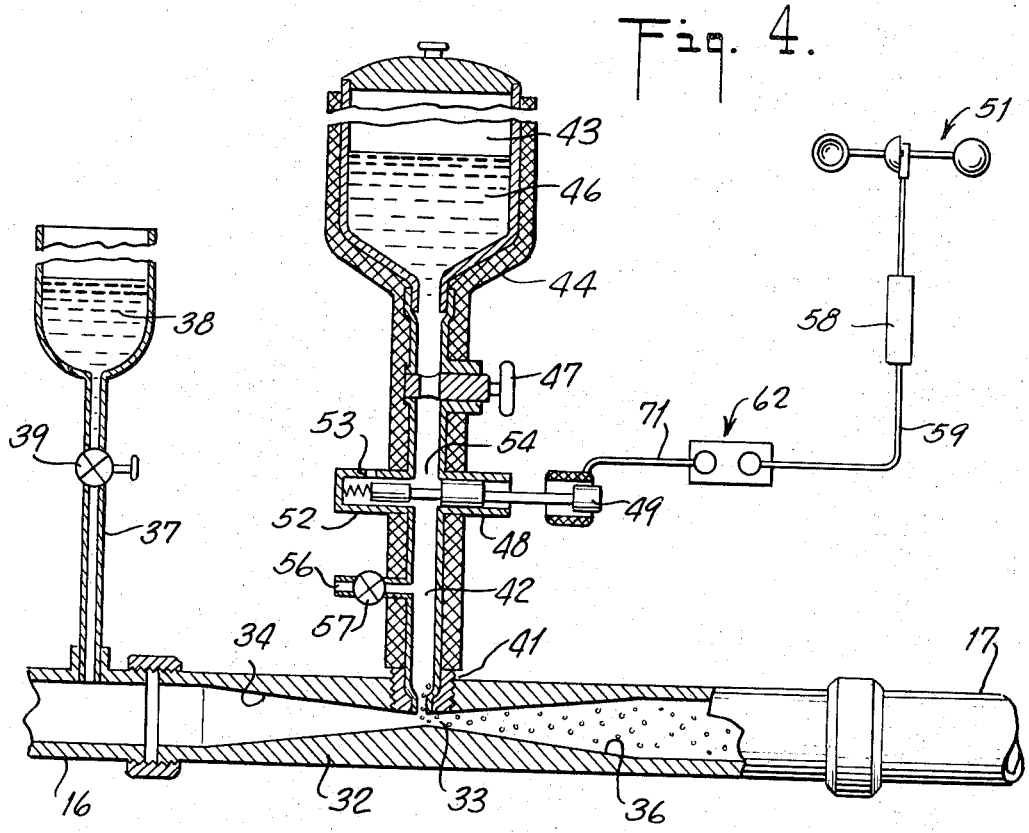
Figure 5:
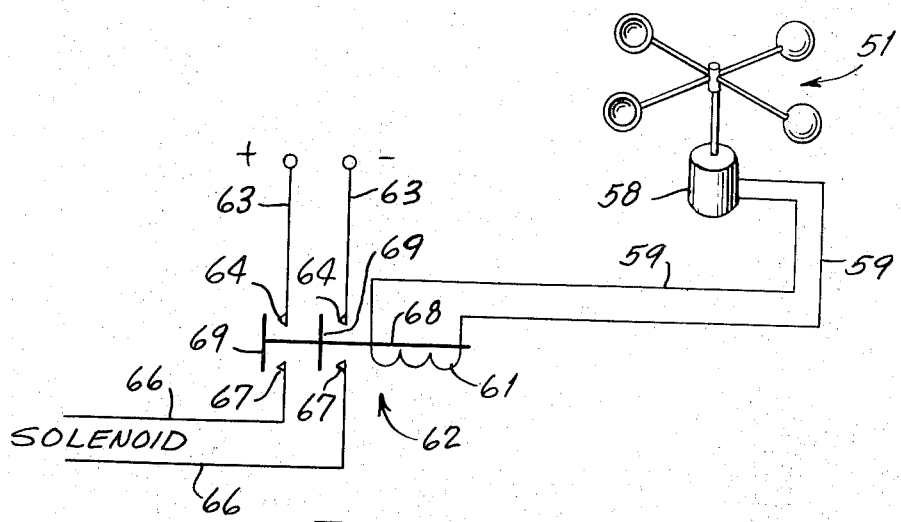

Referring now to FIGS. 4 and 5, when the anemometer 51 is rotating at a predetermined speed representing only relatively mild wind velocity, electrical energy is generated in the anemometer unit 58 and this electrical energy is transmitted to a pair of conductors 59 to the coil 61 of a relay 62. A power line 63 is provided with contacts 64 and a pair of conductors 66 is provided with a pair of contacts 67. When the coil 61 is energized, the armature 68 of the relay is actuated and a pair of contact arms 69 are caused to bridge the contact 64 and 67. Thus, as anemometer 51 rotates, electrical energy is applied to the line 66 and these extend to the motor 13 to energize and drive the same (see FIG. 1). A second pair of conductors 71 extend to the solenoid coil of the solenoid 49 to actuate the solenoid and draw the valve 48 toward the right and to the position shown in FIG. 4 of the drawings. Thus, when the wind is blowing from any direction, water will be pumped through the line 16, liquid oleaginous material will be delivered to the water and the suspension of the oleaginous material in water is moved along the emulsion supply line 17 under pressure for delivery to the valve system and the particular spray head receiving the same.

Before describing in further detail the functioning of the apparatus and the carrying out of the method of the present invention, reference will be made to the modified structures shown in FIGS. 6, 7 and 8.

In FIG. 6, a Venturi-like insert 73, similar to the Venturi-like insert 32 shown in FIG. 4 also has a center portion of reduced diameter to provide a central relatively small dimension opening 74. The inside surface of the insert is tapered from its normal position corresponding generally to the inside diameter of the two pipes with which it is connected to produce annular conical-like recesses defining an upstream angle 76 and a downstream angle 77. A tube for introducing oleaginous material at the center reduced diameter orifice 74 is provided as in the first described embodiment and all parts of this tube and appurtenances thereto may be the same as described in connection with FIG. 4. For convenience and easy identification, the same reference characters are applied to these parts as in FIG. 4. It will be noted that the corresponding angles in FIG. 6 are steeper than shown in FIG. 4 and the significance of these angles will be described hereinbelow.

In FIG. 7 an insert Venturi-like tube 81 is provided with downstream tapered interior surfaces defining a downstream angle 82 and providing a restricted center passageway 83. The upstream portion of the insert 81 is interiorly threaded to receive a special shaped sleeve 84 with inwardly tapered annular projection 86 defining with shoulder 87 an annulus or ring like space 88 with which a top orifice into which the tube 42 projects is in communication. This construction provides for a ring of oleaginous material entirely around the restricted center passageway 83. To maintain the oleaginous material in the ring 88 in liquid condition a heating block 89 is provided extending entirely around the insert 81.

Since normally the emulsion as used in accordance with the present invention will contain relatively a small proportion of oleaginous material, generally less than 0.15% by weight, e.g. in the range 0.01–0.12%, it is possible to introduce sufficient oleaginous material into even a relatively large amount of water by means of the arrangement shown in FIG. 7. If the line 17 is to be partciularly long, however, and is required to supply a large amount of slurry or emulsion, then at times better results may be obtained by introducing two Venturi-like inserts 91, each provided with a top opening into which a supply tube 42 for liquid oleaginous material may be introduced. In this case, both the lines 16 and 17 can be expected to be larger in diameter than in the previous embodiments and to indicate modifications in the diameter of these lines as contrasted with a postulated smaller diameter. The reference numerals 16 and 17 in each instance are preceded by the prefix 1. The Venturi-like inserts 91 may be of any suitable type such as shown in FIG. 4, in FIG. 6, or in FIG. 7, or any like insert answering to the description and definition thereof in the claims.

For convenience of identification, I have referred to the emulsifying unit as a Venturi-like insert to indicate that there is a continuous movement of water from the pump around through the supply line 17 and that the emulsion is formed continuously as contrasted with other methods in which an emulsion is formed in a mixing device on a batch basis. I am aware that in certain types of homogenizing operations such as in treating milk, the liquid is delivered continuously through the homogenizing unit. In the present case, however, we are dealing with an oleaginous material which is normally solid and which may be definitely crystalline in the solid condition at normal room temperature. Conventional homogenizing methods are, of course, not available under these circumstances. This insert as it has been called above should be recognized as an aspirating mixer or emulsifier.

For my present purpose in producing a substantially monomolecular film on an open body of water, I prefer to use a fatty alcohol having from 16 to 22 carbon atoms, or suitably, and in some instances with better results, an ethoxy derivative of such fatty alcohols. Assuming a saturated palmityl alcohol with 16 carbons, the formula therefore will be $C_{16}H_{33}OH$, alcoholic hydroxy group being attached directly to a terminal carbon and each of the bonds of the remaining carbons being satisfied with a hydrogen ion. The corresponding hydroxy derivative has a terminal ethoxy group and may be written

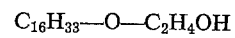

$$C_{16}H_{33}-O-C_2H_4OH$$

and the formula may be written structurally:

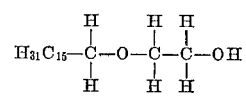

Both the fatty alcohols and the ethoxy derivatives thereof are solid at ordinary room temperature and should be liquefied and delivered to the water stream for emulsification at a temperature not too far above the maximum melting temperature because if they are raised to too high a temperature, the tendency may be to form somewhat larger particles in the emulsion. Normally, a mixture of fatty alcohols will be used, and I may also use a mixture of fatty alcohols and ethoxy derivatives thereof. A single compound is crystalline and has a sharp melting point but a mixture has a range. Thus, a stearyl alcohol has a melting point of about 133° F. but a mixture of alcohols from $C_{16}$ to $C_{18}$ in which stearyl alcohol predominates may have a plastic range of 111° to 117° F. and the apparent melting point is frequently lower than the melting point of the highest molecular weight constituent if pure. While I prefer to employ a mixture running from $C_{12}$ to $C_{22}$, I may also employ alone or mixed with $C_{12}$–$C_{16}$ fatty alcohols a product sometimes referred to as "bottoms" and containing not more than about 8% of stearyl alcohol and lower molecular weight fractions about 38% of $C_{20}$, about 31% $C_{22}$, about 10% $C_{24}$, and about 3% $C_{26}$ alcohols with about 10% impurities.

When a melted oleaginous material is delivered to water in the manner described using an aspirating mixture such as shown in FIGS. 4, 6, or 7, the particles congeal shortly after being incorporated with the water because of the lower temperature. The mechanism is for very thin layers of the oleaginous material to be sheared off. Tubulence downstream of the restricted orifice causes the particles to be broken up still further. When the water is partially heated the period of time during which turbulence may be effective to further break up the particles in an emulsifying action is somewhat increased. The amount of turbulence is determined generally by the downside angle, the greater the angle, generally, the more the turbulence will be obtained. When the turbulence is at a maximum, pumping losses also tend to be at a maximum so, generally speaking, it is preferable to increase the speed at which the aqueous liquid passes through the restricted orifice to produce smaller initial particles and depend less on subsequent turbulence so that by this means to decrease pumping losses at the aspirating mixture.

As to the relative proportions, when the maximum interior diameter of the aspirating mixing is 5/8 of an inch, the restricted orifice may suitably by 1/8 of an inch and the alcohol inlet 1/16 of an inch in diameter. It will be noted that in FIG. 4 both the upstream angle and downstream angle are smaller than the corresponding angles in FIG. 6. Generally speaking, losses in the aspirator mixture are similar to those observed in Venturi meters. By using a slowly diverging cone to decelerate the fluid stream with a minimum of turbulence up to 80 or 90% of the pressure loss at the throat may be restored and pumping losses thereby decreased. If the angle is about 7°, pumping losses will average around 20%.

In accordance with one example of practicing the method I employ an aspirating mixer having a one-eighth inch throat and a vertical orifice for the oleaginous material of 1/16 of an inch communicating with the 1/8 inch of the throat or restricted passageway. The mixer was entirely symmetrical except for the vertical orifice and the sides of the cone upstream defined an angle of 95° and the diverging cone defined an angle of 25°. A mixture of alcohols from $C_{16}$ to $C_{18}$ was dissolved at ambient temperature in hexane in proportion of one part by weight of alcohol and 1.76 parts by weight of hexane. Water was passed through the throat at a speed of 30 feet per second and an emulsion formed in which the average size of the oil phase was 25 microns. When the water speed was increased to 50 feet per second, the particle size was 10 microns and when increased to 75 feet per second, particle size averaged 5 microns.

Similar results were also obtained when the mixture of fatty alcohols was dissolved in white gasoline in proportion of about 1 part by weight of the solid alcohols and 15 parts by weight of white gasoline.

In general, identical results can also be obtained by melting the alcohol or ethoxy derivative thereof to a temperature just above its melting point, and if the water temperature is not below approximately 75 or 80° F., a condition frequently found in western streams and impounded waters so that heating of the water is not necessary, introducing the melted fatty alcohol into a stream of water moving at fifty feet per second will produce an emulsion at which the oleaginous disperse phase comprises particles not more than about 10 microns in diameter.

In discussing the concentration of the oleaginous phase, it was explained that it should not be more than about 20% by weight and preferably that the proportions should be somewhat less. I have determined that when the emulsion contains more than about 10% of fatty alcohol or derivative, viscosity increases to the point where pump pressures must be increased to make up for the added resistance to flow. An advantage of the present invention is that the emulsion can be produced directly with about 10% or more of oleaginous material and further dilution with water for delivery to the supply line 17 may be accomplished, as shown in FIG. 9, or by simply returning the emulsion stream to the inlet of the pump.

The concentration of the emulsion actually sprayed on the water in accordance with my invention will depend on the wind velocity and will generally be less than .15% by weight in oleaginous material but up to about 1% of oleaginous material can be used. With this dilution and with the small particle size, film spreading rates of more than ½ foot per second are possible. It can be calculated that to produce a monomolecular film between about 8 and 10 grams fatty alcohol are required per acre of water depending upon the specific fractions used. This is equivalent to about 12 pounds per square mile. Previous methods for introducing fatty alcohols to a surface did not approach these figures for various reasons including the relatively large particle sizes, losses of aerosols to air, a tendency for much of the alcohol to stay beneath the surface when it was submerged in a spraying operation, and for still other reasons. Using a very dilute emulsion with relatively very small particle size of fatty alcohols or other oleaginous material and with a light, finely divided spray near the surface of the water and settling gently on the water surface, it is possible employing the present invention to approach closely ideal film conditions which will retard water evaporation by a figure approaching theoretical maximum efficiencies. Film replacements can also be accomplished in accordance with normally calculated requirements, giving due consideration to local degrading conditions.

I have indicated hereinabove, in connection with FIGS. 1, 4 and 5, that the motor 13 may be stopped when the wind velocity is decreased below a given rate. By merely furnishing power directly to the motor, it will be unaffected by the wind velocity and spraying will be continued, although the supply line will then receive clear water. The best manner of operation depends in part on local conditions.

In FIG. 9, I show a more sophisticated emulsifying apparatus in which a line 92, running to a source of water, such as of an impounded lake, leads to the intake side of a centrifugal pump 93 and its output delivered to a line 94 adapted to be connected to the supply line 17. A shunting pipe 96 has an aspirator 97 into which the tube 42 from the fatty alcohol receptacle 43, not shown, extends. Oleaginous material is thus delivered to the water in the shunting pipe 96 and is admixed with and diluted by a further supply of water. Because of the arrangement shown, the diluted emulsion entering the pump 93 is delivered to pipe 96, but an equilibrium condition is quickly reached. The valves 98 and 99 permit control of the amount of liquid bypassed. Aspirator 97 may also be used as a diluting device when tube 42 receives an emulsion from aspirator 33. For example, an emulsion from aspirator 33 with 10% oleaginous material may have its oleaginous content decreased to one percent or less at the pump outlet.

By using a suitable anemometer and conventional type circuit, electrical contact may be made for every predetermined fraction of a mile per hour of wind velocity through a relay 102 to control the action of a solenoid 103 and control the position of a sliding valve 104 constructed similarly to valve 48 (FIG. 4). By this means, the proportion of oleaginous material in the emulsion may be controlled in response to wind velocity.

It appears essential that I refer more specifically to certain details of the invention for the benefit of those skilled in the art, and to clarify the scope of the invention as defined by the claims. First, it may be noted that technically, an emulsion is usually thought of as a mixture of immiscible liquids such as oil and water in which one liquid, e.g. the oil or fatty alcohol, is dispersed in finely divided form in the other, e.g. water. When I employ a normally liquid material such as oleyl alcohol; a solution such as of alcohol in hexane, or a melted liquefied, oleaginous solid, or heated water with a solid melting below the temperature of the water, the resulting product is technically in all respects an emulsion. By heating the water, the life of the true emulsion may be increased. Also, when a solvent is used, heating will decrease the amount of solvent needed. Should the dispersed liquefied finely divided oleaginous material solidify, then technically, the emulsion would become a suspension when the discrete disperse phase particles solidify. For simplicity, however, I have employed the term emulsion throughout to identify the product as sprayed .

Frequently there is a tendency for some of the oleaginous material to be projected beneath the surface and "drown" if it should strike the water surface with any violence such as will occur if a gusty wind is blowing. A three phase emulsion of gas, aqueous liquid and oleaginous material will float more readily than if the air is not present. It is obvious that instead of air, any suitable gas, such as $N_2$, $O_2$, $H_2$, CO, $CO_2$, a rare gas, or some halogens or mixture of gases may be used.

I referred hereinabove to the production of a film comprising substantially a monomolecular layer of an alcohol, for example, with the molecules orientated vertically. Because of the gradual degradation of the film from various causes, it is usually advisable that somewhat more than a monomolecular film be formed, so that, as the film is blown to a wind facing shore, the final film will have essentially a monomolecular character. The film of the present invention not only limits evaporation, but has a strong action in suppressing wave formation.

The use of a distribution pipe with a plurality of valves has certain advantages, but single spray devices may be directly connected to the line 17, or any other suitable provision made for introducing a spray on top of the water near a windward shore.

The above procedure can be employed to form fairly concentrated emulsions, such as emulsions containing up to about 10–20% by weight oleaginous material which upon further dilution with water to yield an emulsion containing less than about 1% by weight oleaginous material, can then be applied to the surface of an open body of water to retard evaporation therefrom.

Cold water, e.g. water at a temperature below about 100° F., of course, is also useful in the practice of this invention to produce satisfactory emulsions. For example, cold water has been used to produce emulsions wherein the patricle size of the suspended oleaginous material is in the range 5–50 microns. Emulsifying agents, such as the alkyl sulfates, are useful for the preparation of stable emulsions and may be employed by separate addition to the flowing water stream during emulsification or in admixture with the oleaginous material to be emulsified.

The techniques and apparatus of this invention in addition to being useful for reducing evaporation losses are also useful for wave suppression to provide a calm surface on an open body of water. Additionally, the techniques and apparatus of this invention are also useful for reducing and suppressing fog, particularly early morning fog, oftentimes observed over open bodies of water.

I have described my invention in detail so that those skilled in the art may understand the manner of practicing the same, but the scope of the invention is defined by the claims.

I claim:

1. The method of retarding evaporation from the surface of a body of water by applying oleaginous material onto said surface to form a substantially monomolecular layer of said oleaginous material on said surface which comprises continuously moving a stream of water at a relatively high speed through a relatively narrow opening, delivering said oleaginous material in liquefied form relatively slowly and in a stream smaller than said water stream to cause said oleaginous material to enter the water stream and to be dispersed therein in the form of very small droplets to form a resulting emulsion stream in which the water is the continuous phase and the oleaginous material is the dispersed phase, said oleaginous material comprising a fatty alcohol having a carbon atom content in the range $C_{10}$–$C_{26}$ and a minor amount by weight of said oleaginous material of the ethoxy derivative of said fatty alcohol, moving the resulting emulsion stream to the shoreline of the body of water and spraying the emulsion of said oleaginous material onto said water surface from a position near the surface so as to gently settle the resulting spray on the water surface.

2. A method in accordance with claim 1 wherein said droplets have an average particle size diameter not greater than about 50 microns.

3. A method in accordance with claim 1 wherein the oleaginous material is present in said emulsion sprayed onto the water surface in an amount not greater than about 1% by weight.

4. A method in accordance with claim 1 wherein said water stream is heated to a temperature above the temperature of said body of water.

5. A method in accordance with claim 1 wherein said stream of water moving through said relatively narrow opening contains a minor amount of said oleaginous material dispersed therein.

6. A method in accordance with claim 1 wherein a portion of the resulting emulsion stream is recycled for admixture with said stream of water.

References Cited

UNITED STATES PATENTS

| | | | |
|---|---|---|---|
| 2,563,002 | 8/1951 | Bissell et al. | 259—4 |
| 2,797,140 | 6/1957 | Veatch | 21—60.5 |
| 2,878,098 | 3/1959 | Treloar et al. | 21—61 |
| 2,903,330 | 9/1959 | Dressler | 21—60.5 |
| 3,036,880 | 5/1962 | Malkemus | 21—60.5 |
| 3,127,235 | 3/1964 | Benzel | 21—60.5 |
| 3,184,789 | 5/1965 | Florey et al. | 21—60.5 XR |
| 3,199,944 | 8/1965 | Gabor et al. | 21—60.5 |
| 3,425,791 | 2/1969 | Koberg | 21—60.5 |

FOREIGN PATENTS

| | | |
|---|---|---|
| 898,431 | 6/1962 | Great Britain. |

MORRIS O. WOLK, Primary Examiner

B. S. RICHMAN, Assistant Examiner